UNITED STATES PATENT OFFICE 2,140,480

3-KETO-D-PENTONIC ACID LACTONE AND PROCESS FOR THE MANUFACTURE OF SAME

Tadeus Reichstein, Zurich, Switzerland, assignor to Hoffmann-La Roche Inc., Nutley, N. J., a corporation of New Jersey No Drawing. Application April 10, 1937, Serial No. 136,229. In Switzerland March 12, 1937

9 Claims. (Cl. 260—344)

Of the two theoretically possible forms of the lactone of 3-keto-pentonic acid, i. e. the dextro- and laevo-forms, only the laevo-form is so far known. (Helvetica Chimica Acta 17, 1934, page 1003.)

It has now been found that the particularly valuable 3-keto-d-pentonic acid lactone can be readily obtained in good yield from derivatives of d-xylosonic acid and d-ribosonic acid capable of being hydrolized by acids by heating in, or letting the compounds stand for some time at room temperature in, an acid medium.

As starting materials the salts, esters, methylene-ether derivatives and alkyl-lactolides of the two acids can be used. It is particularly advantageous to heat with an excess of alcoholic hydrochloric acid as this enables the reaction-product to be easily isolated. But sulphuric acid, toluene-sulfonic acid and the like, as well as purely organic acids are also suitable for this purpose. For the rearrangement of free mono-methylene-ether-d-xylosonic acids, an addition of acid is not even necessary. Such an addition only accelerates the reaction which takes place when the temperature is raised. Dioxane and other ethers can be used as solvents. Mixtures of alcoholic hydrochloric acid and an indifferent solvent, such as benzene, chloroform etc., are also very suitable. The reaction can be formulated as follows:

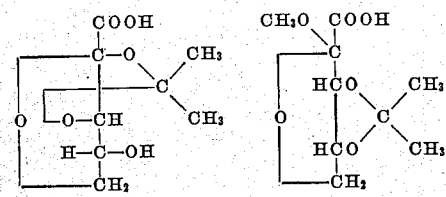

Mono-acetone-d-xylosonic acid (Formula 1)

Methyl-lactolide of mono-acetone-d-ribosonic acid (Formula 2)

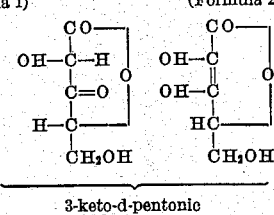

3-keto-d-pentonic acid lactone (Formula 3)

The 3-keto-d-pentonic acid lactone crystallizes in needles melting at 156° C., its specific rotation being $$[\alpha]_D^{20°} = -11° \pm 2°$$

($c=1$ in 0.01 n-hydrochloric acid). The compound is very readily soluble in water, methanol, alcohol and acetone, soluble in dioxane, moderately in ethyl-acetate, only slightly soluble in ether and benzene and practically insoluble in petroleum-ether. It is completely analogous in its reducing action to the well-known ascorbic acid. The aqueous solution prepared at 0° C. rapidly neutralizes one molecule of alkali, while at a somewhat higher temperature, or when the neutralization is carried out more slowly, more alkali is neutralized. The 3-keto-d-pentonic acid lactone possesses a very high anti-scorbutic activity and is to be used as a medicine.

Example 1

10 parts by weight of potassium mono-acetone-d-xylosonate are boiled for 5 hours with 200 parts by weight of 4% alcoholic hydrochloric acid under a reflux-condenser. The product is separated from the potassium-chloride formed and the solution evaporated in vacuo. The residue is recrystallized from ethyl-acetate. The 3-keto-d-pentonic acid lactone is obtained in well-developed crystals.

Example 2

1 part by weight of acetone-2-keto-d-ribonic acid methyl-lactolide is dissolved in 25 parts of water. Then 0.5 part by weight of 2-n-hydrochloric acid are added and the solution heated on the water-bath for one hour, air being excluded by introducing a current of carbon-dioxide. The solution is now evaporated in vacuo, the residue dissolved in alcohol and precipitated with alcoholic lead-acetate. The lead-acetate precipitate is suspended in water saturated with carbon-dioxide, treated with hydrogen-sulfide in the cold and the solution sucked off from the lead-sulfide and evaporated to a sirup in vacuo. For purification, the residue is dissolved in little acetone, treated with pure ethyl-acetate and the greater part of the acetone removed by distillation. On inoculating the clear solution, the 3-keto-d-pentonic acid lactone crystallizes.

Example 3

10 parts by weight of the methyl-ester of d-mono-acetone-xylosonic acid are heated with 200 parts by weight of 4% alcoholic hydrochloric acid and 100 parts by weight of benzene under a reflux-condenser. When the reducing action of a test-portion of 5 cc. no longer increases on further heating the solution is evaporated in vacuo and the residue recrystallized from ethyl-acetate.

I claim:

1. Process for producing 3-keto-d-pentonic acid lactone, which comprises treating a substance selected from the group consisting of carboxylic acid esters, carboxylic acid salts, methylene ethers, methylene ether carboxylic acid salts, and methylene ether carboxylic acid esters of d-xylosonic acid, which is capable of being hydrolyzed in an acid medium with an acid.

2. Process for producing 3-keto-d-pentonic acid lactone, which comprises treating a substance selected from the group consisting of carboxylic acid esters, carboxylic acid salts, methylene ethers, methylene ether carboxylic acid salts, and methylene ether carboxylic acid esters of d-xylosonic acid, which is capable of being hydrolyzed in an acid medium with an acid at room temperature.

3. Process for producing 3-keto-d-pentonic acid lactone, which comprises heating a substance selected from the group consisting of carboxylic acid esters, carboxylic acid salts, methylene ethers, methylene ether carboxylic acid salts, and methylene ether carboxylic acid esters of d-xylosonic acid, which is capable of being hydrolyzed in an acid medium with an acid.

4. Process for producing 3-keto-d-pentonic acid lactone, which comprises treating a substance selected from the group consisting of carboxylic acid esters, carboxylic acid salts, methylene ethers, methylene ether carboxylic acid salts, and methylene ether carboxylic acid esters of d-xylosonic acid, which is capable of being hydrolyzed in an acid medium with an acid in an organic solvent in substantial absence of water.

5. Process for producing 3-keto-d-pentonic acid lactone, which comprises treating a substance selected from the group consisting of carboxylic acid esters, carboxylic acid salts, methylene ethers, methylene ether carboxylic acid salts, and methylene ether carboxylic acid esters of d-xylosonic acid, which is capable of being hydrolyzed in an acid medium with an acid in an indifferent solvent in substantial absence of water.

6. Process of producing 3-keto-d-pentonic acid lactone which comprises treating potassium mono-acetone-d-xylosonate with hydrochloric acid.

7. Process of producing 3-keto-d-pentonic acid lactone which comprises treating potassium mono-acetone-d-xylosonate with hydrochloric acid in a diluent.

8. Process of producing 3-keto-d-pentonic acid lactone which comprises treating potassium mono-acetone-d-xylosonate with alcoholic hydrochloric acid.

9. Process of producing 3-keto-d-pentonic acid lactone which comprises heating potassium mono-acetone-d-xylosonate with alcoholic hydrochloric acid.

TADEUS REICHSTEIN.